(No Model.)   2 Sheets—Sheet 1.

F. E. CASE.
FOUR MOTOR REVERSING SWITCH.

No. 543,670.  Patented July 30, 1895.

WITNESSES  
A. F. Macdonald.  
B. B. Hull.

INVENTOR  
Frank E. Case, by  
Geo. R. Blodgett,  
Atty.

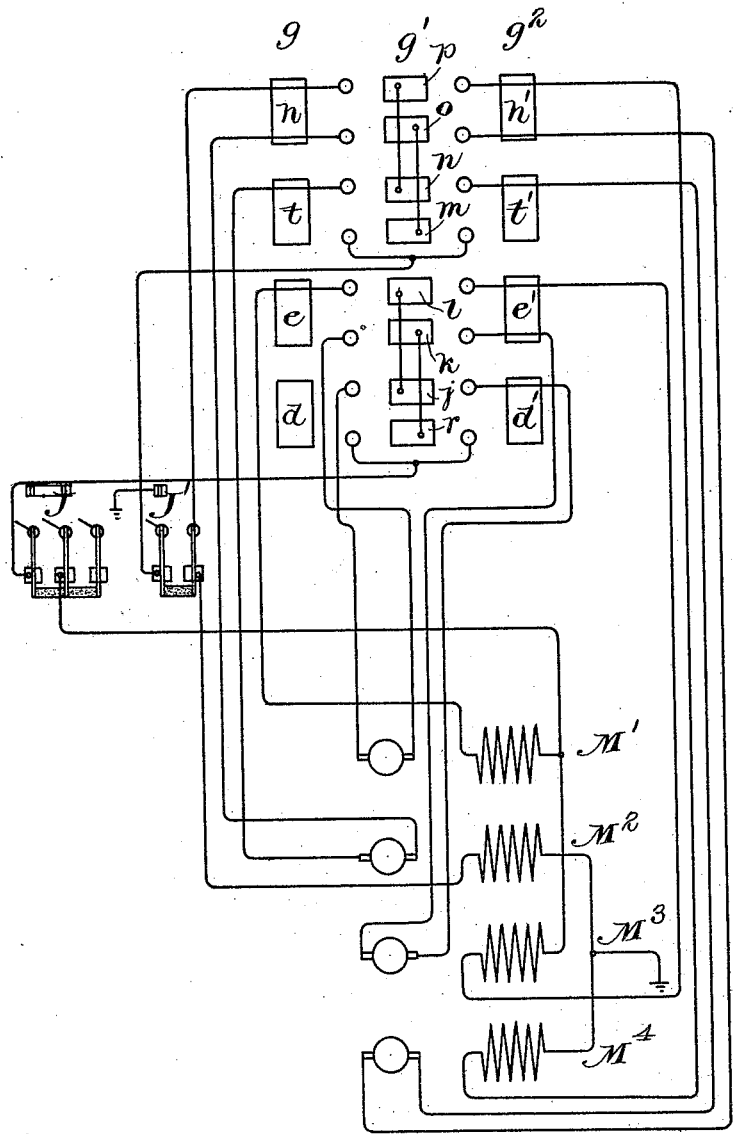

UNITED STATES PATENT OFFICE.

FRANK E. CASE, OF SCHENECTADY, NEW YORK, ASSIGNOR TO THE GENERAL ELECTRIC COMPANY, OF NEW YORK.

FOUR-MOTOR REVERSING-SWITCH.

SPECIFICATION forming part of Letters Patent No. 543,670, dated July 30, 1895.

Application filed May 15, 1895. Serial No. 549,382. (No model.)

*To all whom it may concern:*

Be it known that I, FRANK E. CASE, a citizen of the United States, residing at Schenectady, in the county of Schenectady, State of New York, have invented certain new and useful Improvements in Four-Motor Reversing-Switches, of which the following is a specification.

The present invention is an improvement on the controller shown in Patent No. 524,396 to W. B. Potter, and the object is to adapt that form of controller for use with either two or four motors without changing the construction to any marked degree, the only change necessary being in the reversing-switch, and to this is added an extra set of contacts and brushes bearing thereon, the contacts being so situated on the switch-cylinder that the cross-connected ones are common to both the existing and the added brushes; and, furthermore, this may be used for a regular two-motor equipment by simply leaving the added brushes open-circuited. This is an advantage where a controller is sent out for a two-motor controller and it is found desirable to have four motors instead. By such a construction the controller is adapted to run four motors, and by the use of cut-out switches two of the motors may be cut out, as in case of accident, and in that event the remaining motors are connected in parallel with each other and in series with the resistance, which may be gradually cut out and in by suitable contacts and brushes on the controller. In the series-parallel control of railway-motors it has been found desirable to divide the motors up in such a manner as to have at least one active motor on each truck for the purpose of obtaining the maximum tractive effect of the motors while changing from series to parallel, as described in Patent No. 520,787 to W. H. Knight.

In the present invention the motors are permanently connected in pairs, and the pairs of motors are treated as though they were single motors—that is, in changing from series to parallel the two motors forming one pair are thrown in parallel with the second pair and they are so mounted that one of the first pair is on the same truck with one of the second pair.

Figure 1:
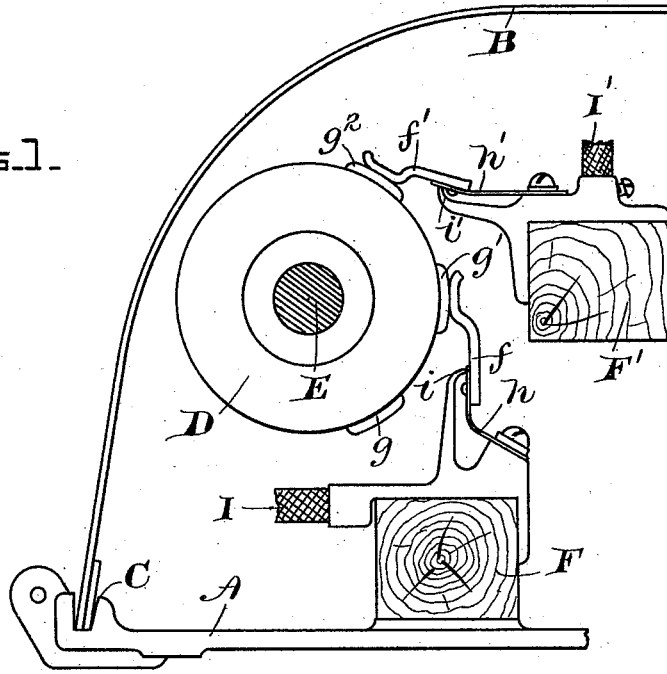
Figure 2:
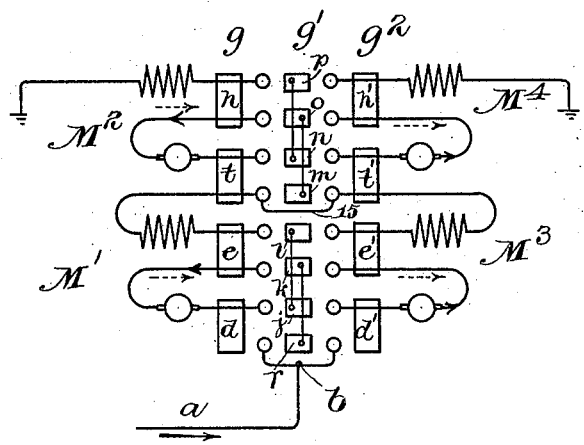

In the accompanying drawings, Figure 1 is a plan view, partially in section, of my improved apparatus. Figs. 2 and 3 are diagrammatic views illustrating the operation thereof.

A is the back of the controller, to which are secured by suitable means the various parts thereof.

B is the inclosing-case, made of any suitable material and fitting into a groove C on the back of the controller.

The reversing-switch cylinder D is made of insulating material, such as wood or fiber, upon which are mounted three sets of contacts $g\ g'\ g^2$, occupying less than one hundred and eighty degrees of the circumference of the cylinder. By mounting the contacts on the cylinder D in the manner described the motorman is enabled to reverse his motors quickly and by a small angular movement of the reversing-handle, which is an advantage on a crowded car, where the space is very limited. It also permits the brushes to be placed near together and in an accessible part of the controller. The switch is revolubly mounted on the shaft E, which is provided with suitable bearings, not shown for clearness of illustration.

$I\ I'$ are cables leading from the motors and resistance-boxes.

The brushes, of which there are two sets, are mounted on blocks of wood $F\ F'$, and these are secured by any suitable means. The brushes $f f'$ are made of pieces of copper and pressed into engagement with the rows of contacts $g\ g'\ g^2$ by springs $h\ h'$. Stops $i\ i'$ are provided to limit the movement of the brushes $f f'$. Referring now to Fig. 2, which shows the invention in its simplest form, it will be seen that the motors $M'\ M^3$ form a pair and are reversed by the contacts at the lower part of the cylinder, the cross-connected contacts $r\ k\ j\ l$ being arranged in a lower series and connected so as to form pairs. The motors $M^2\ M^4$ also form a pair and are reversed by the upper series of contacts $m\ n\ o\ p$, also connected so as to form pairs. If for any cause motors $M^3\ M^4$ were disabled and the brushes raised so as not to make contact with the cylinder, the same condition of affairs would be had as in the Patent No. 524,396 to W. B. Potter, already referred to, and it will now be evident that to utilize this controller for four motors a single row of brushes and contacts is added, the rest remaining the same.

The operation of the device will now be described. Assuming that the brushes are on the rows of contacts $g'$ $g^2$, which position corresponds with that shown in Fig. 1, the circuit would be as follows: The current entering the wire $a$ would divide at the point $b$, and the path through the motor $M'$ would be through contact $r$, cross connection to contact $k$, through the armature to contact $j$, cross connection to contact $l$, through the field to contact $m$. Going back to the point $b$, where the current first divided, the second path would be by contact $d'$, through the armature of motor $M^3$ to contact $e'$, through the field to contact $t'$, where it unites with the current from motor $M'$ by means of cross connection 15. Continuing the circuit, it divides again at this point, flowing through motor $M^2$ by way of contact $m$, cross connection to contact $o$, through the armature to contact $n$, by cross connection to contact $p$, thence through the field to ground. The circuit through motor $M^4$ would be from 15 through contact $t'$ to the armature of the motor, contact $h'$ through the field to ground. The direction of the current in the armatures is indicated by the arrows.

Assume now that the position of the contacts has been shifted relative to the brushes and that the latter are now resting on rows of contacts $g$ $g'$, then the current entering by wire $a$ would divide at $b$ and again flow through the motors by means of contacts, as explained above; but the current flowing in the armatures will be reversed, as indicated by the dotted arrows.

Referring now to Fig. 3, it will be seen that motors $M'$ $M^3$ and $M^2$ $M^4$ are permanently connected together, and the connections with the cut-out switches J J' are so arranged that the opening of either switch cuts out of circuit a pair of motors.

The connections from the switches to the controlling-cylinder are not shown, for it is immaterial what form of controller is used.

What I claim as new, and desire to secure by Letters Patent of the United States, is—

1. The combination in a reversing switch, of a row of contacts adapted to be connected to line in either position of the switch, and two or more rows of contacts and brushes, each one leading to and adapted to reverse one or more motors.

2. As an article of manufacture, a four motor reversing switch cylinder having three rows of contacts, the middle row being cross-connected relative to each other, the outer contacts being wide enough to engage with two brushes, the middle contacts with one.

3. In a four motor reversing switch, the combination of three rows of contacts mounted on a cylinder, with two sets of brushes, one set leading to one pair of motors and the second set to a second pair of motors, engaging with the contacts, one row of contacts being common to both sets of brushes.

4. In a four motor reversing switch, the combination of three rows of contacts mounted on a cylinder, with two sets of brushes making contact therewith, the middle and one set of outer contacts being connected so as to cause the motors to revolve in one direction, and the middle and remaining outer contacts causing them to revolve in the opposite direction.

5. In a four motor reversing switch, the combination of three rows of contacts mounted on a cylinder, two sets of brushes engaging therewith, the outer contacts engaging with two brushes, the inner contacts with one, the inner contacts being arranged in an upper and lower series, each series consisting of pairs of contacts cross-connected, the said series of contacts being common to both sets of brushes.

6. In a four motor reversing switch, with the motors connected in pairs, the combination of three rows of contacts, brushes making contact therewith, the inner contacts being arranged in an upper and lower series, the contacts in the series being arranged to form pairs, the leads from two of the motors which form a pair going to the lower series, and those from the remaining pair going to the upper series.

In witness whereof I have hereunto set my hand this 10th day of May, 1895.

FRANK E. CASE.

Witnesses:
B. B. HULL,
A. F. MACDONALD.